United States Patent [19]
Ito et al.

[11] Patent Number: 5,671,014
[45] Date of Patent: Sep. 23, 1997

[54] VIDEO APPARATUS WITH IMAGE FORMING MEANS RESPONSIVE TO TOUCH SENSITIVE DISPLAY

[75] Inventors: Masanobu Ito, Saitama; Shunji Motohashi, Kanagawa; Yoshinari Higuchi, Tokyo, all of Japan

[73] Assignee: Sony Corporation, Tokyo, Japan

[21] Appl. No.: 521,576

[22] Filed: Aug. 30, 1995

[30] Foreign Application Priority Data

Sep. 5, 1994 [JP] Japan ................... 6-211279

[51] Int. Cl.$^6$ ................... H04N 5/262
[52] U.S. Cl. ................... 348/239; 348/589; 348/600; 345/173
[58] Field of Search ................... 348/239, 589, 348/600, 584, 722, 598, 601; 345/173–178, 179–183; 395/100, 118, 152, 154, 153, 159; 364/927.64

[56] References Cited

U.S. PATENT DOCUMENTS

| 4,521,870 | 6/1985 | Babbel et al. | 364/900 |
|---|---|---|---|
| 4,608,603 | 8/1986 | Johnson | 358/183 |
| 4,720,805 | 1/1988 | Vye | 364/525 |
| 4,999,709 | 3/1991 | Yamazaki et al. | 348/239 |
| 5,185,115 | 2/1993 | Black et al. | 340/708 |
| 5,327,160 | 7/1994 | Asher | 345/156 |
| 5,430,496 | 7/1995 | Silverbrook | 348/600 |
| 5,438,438 | 8/1995 | Lee | 348/589 |
| 5,479,205 | 12/1995 | Silverbrook | 348/239 |

OTHER PUBLICATIONS

Patent Abstracts of Japan, vol. 13, No. 429, Sep. 25, 1989 & JP-A-01 158885 (Yukihisa).
UK Patent Application GB 2 096 967 A, Oct. 20, 1982 (Mellor).
World Patent Application WO 89/03085, Apr. 6, 1989 (Fox).
European Patent Application EP-A-0 581 286 A1, Feb. 2, 1994 (Tagaki et al.).
European Patent Application EP-A-0 656 726 A1, Jun. 7, 1995 (Uekane et al.).

Primary Examiner—John K. Peng
Assistant Examiner—Nathan J. Flynn
Attorney, Agent, or Firm—Jay H. Maioli

[57] ABSTRACT

A title can be easily inserted in a video image while taking a video picture. A touch panel is provided on a display screen of an LCD panel. An analog switch section supplies coordinate values Vx, Vy representative of a position of a touch panel pressed by a pen to a microcomputer. The microcomputer adjusts and processes the coordinate values Vx, Vy such that they match a picture angle of the LCD panel and a dot appears at the position pressed by the pen and writes the dot data in the corresponding address of an SRAM. A RAM controller reads the dot data from the SRAM in synchronism with a pick-up video signal under control of the microcomputer and controls selection of switches in response to the dot data. A white level signal corresponding to the dot data is superimposed on the pick-up video signal to generate a display video signal and a recording video signal.

10 Claims, 11 Drawing Sheets

5,671,014

VIDEO APPARATUS WITH IMAGE FORMING MEANS RESPONSIVE TO TOUCH SENSITIVE DISPLAY

BACKGROUND OF THE INVENTION

1. Field of the Invention

The present invention relates to a video apparatus that is suitable for a VTR combined with a camera and the like including a large size liquid crystal display (LCD) panel.

2. Description of the Related Art

In a conventional titler (title producer) for a video camera, an image, such as characters, graphics and the like, is drafted on a white paper with writing materials having deep colors and the drafted paper is taken imaged by the camera to generate a title image.

As described hereinbefore, the conventional titler requires the white paper on which the image is drafted as a title picture. Thus, it is troublesome to insert the titles into the video image while concurrently recording the video picture.

SUMMARY OF THE INVENTION

The present invention provides a video apparatus that can insert easily the title into the video picture during, for example, a period while the video picture is being taken.

The video apparatus according to an embodiment of this invention comprises a display device, position detecting means provided on a display screen of the display device for detecting a pressed position on the display screen, image data producing means for producing image data in response to the pressed position detected by the position detecting means, and superimposing means for superimposing the image data produced by the image data producing means on a video signal to be applied to the display device.

In addition, the video apparatus according to the present invention comprises a display device, position detecting means provided on a display screen of the display device for detecting a pressed position on the display screen, superimposing means for superimposing an operation key screen data on a video signal to be applied to the display device, and operation signal generation means for generating an operation signal corresponding to the operation key displayed at the pressed position to be detected by the position detecting means.

According to the present invention, the image data, such as the title image, can be produced easily by pressing the display screen of the display device. Since the produced image data is superimposed on the video signal and applied to the display device, the image data can be formed while confirming the formed image with the display screen. The invention displays on the display screen the operation keys necessary only for the next operation, so that the contents of the display screen is not complex and operability can be improved.

DETAILED DESCRIPTION OF PREFERRED EMBODIMENTS

Figure 1:
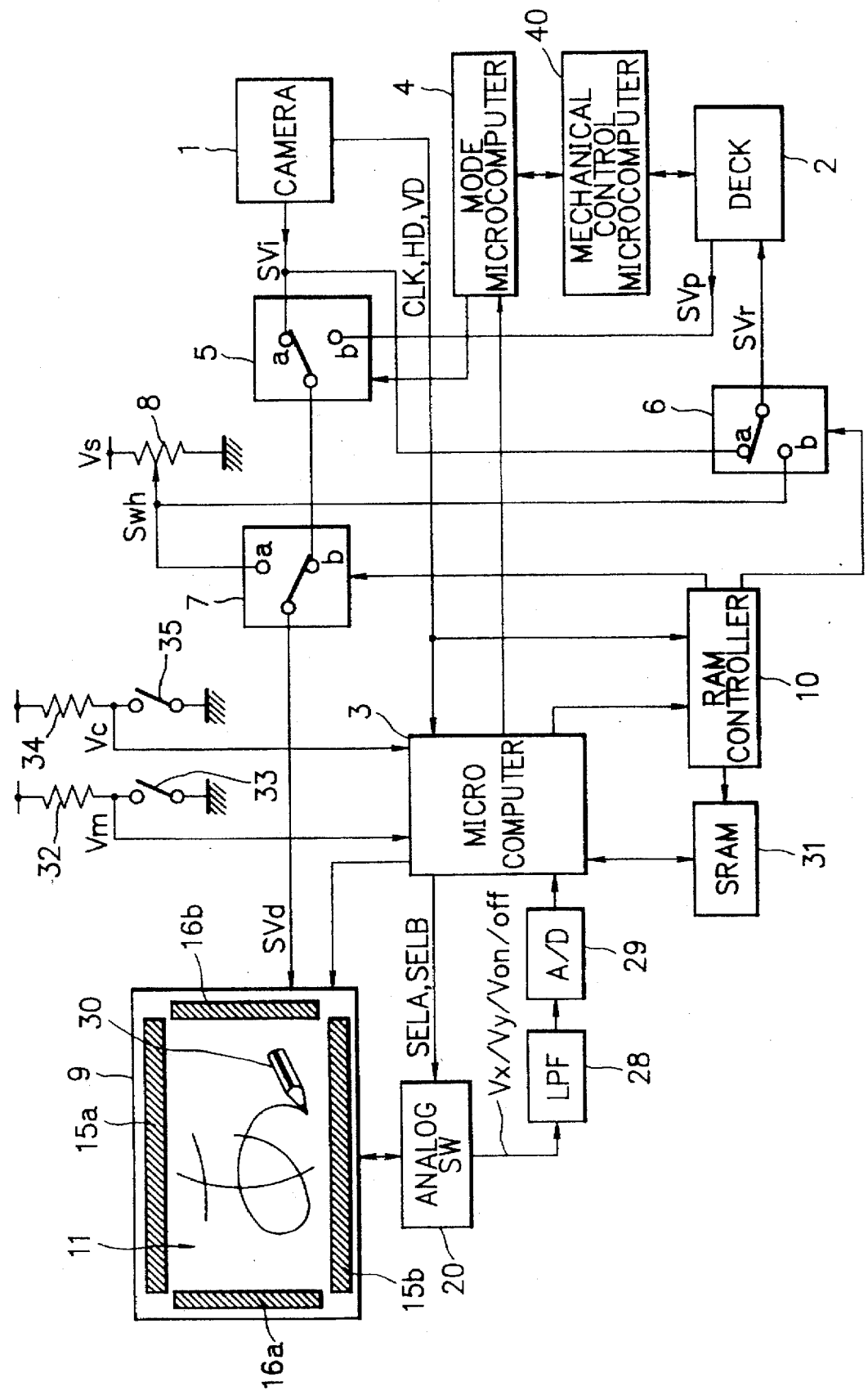
FIG. 1 is a block diagram of one embodiment of a video apparatus according to this invention.

One embodiment of this invention will be discussed with reference to FIG. 1. This embodiment is applied to a united VTR with a camera having a large size LCD panel.

In this drawing, a camera section 1 comprises an image pick-up lens, an image pick-up device, an image signal processing circuit and the like and produces a pick-up video signal SVi. A deck section 2 comprises a rotation head device, a record/replay processing circuit and the like and records and replays a video signal on or from a recording track of a magnetic tape. The operation modes of the deck section 2 are controlled by a mechanical control microprocessor 40 under control of a mode microprocessor 4. The mode microprocessor 4 is connected to a microcomputer 3 that receives a master clock signal CLK, a horizontal synchronous signal HD and a vertical synchronous signal VD from the camera section 1.

The pick-up video signal SVi from the camera section 1 is applied to a fixed contact a of a switch 5 as well as a fixed contact a of a switch 6. A fixed contact b of the switch 5 receives a replayed video signal Svp from the deck section 2. An output signal from the switch 5 is applied to a fixed contact b of a switch 7.

A variable resistor 8 is used to set a white level signal and is connected between a power supply voltage contact receiving a DC voltage Vs and ground. A white level signal Swh from a movable contact of the variable resistor 8 is applied to a fixed contact a of the switch 7 and a fixed contact b of the switch 6. The output signal from the switch 6 is a recording video signal SVr that is applied to the deck section 2. The output signal from the switch 7 is a display video signal SVd that is applied to a color LCD panel 9. The mode microprocessor 4 controls the switch 5 where a movable contact is connected to the contact b for the replay period and is otherwise connected to the contact a. The switching operations of the switches 6 and 7 are controlled by a RAM controller 10 that will be discussed hereinafter.

Figure 2:
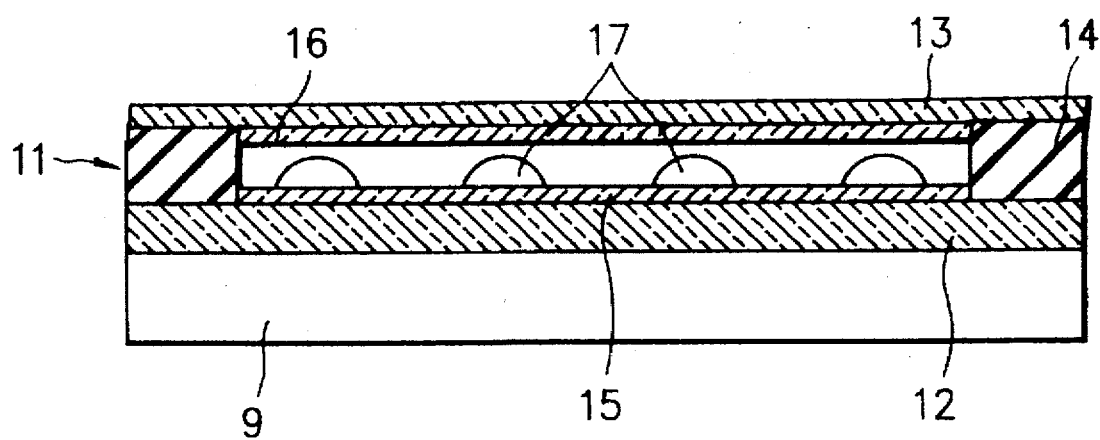
FIG. 2 is a cross sectional view of a configuration of a resistance film type touch panel.

A resistance film type touch panel 11 is mounted on a display screen of the LCD panel 9. FIG. 2 shows a configuration of the touch panel 11. In this drawing, a glass substrate 12 and a film sheet 13 are supported by a spacer 14 at the peripheral edge portions such that the glass substrate 12 faces the film sheet 13. ITO (Indium Tin Oxide) films 15 and 16 are transparent resistance films and are coated on the opposite surfaces of the glass substrate 12 and the film sheet 13. A plurality of dot spacers 17 are provided on the ITO film 15 coated on the surface of the glass substrate 12 at a constant interval.

Figure 3:
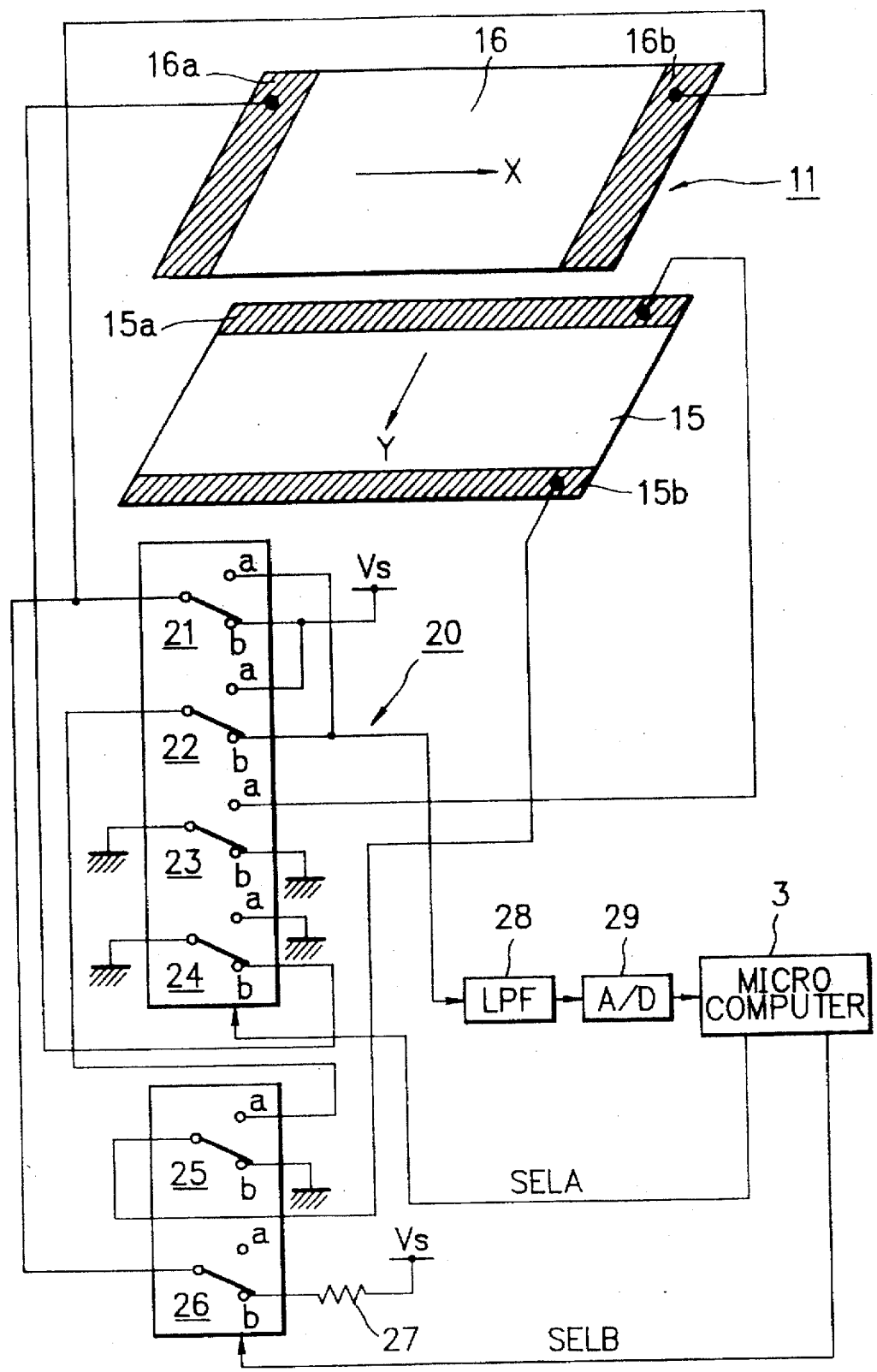
FIG. 3 illustrates a system for detecting a pushed position of the touch panel.

FIG. 3 shows a position detection system of the touch panel 11. Electrodes 16a and 16b (not shown in FIG. 2) made of carbon or the like are provided on both edge portions of the ITO film 16 formed on the film sheet 13 surface in a horizontal (X) direction and electrodes 15a and 15b (not shown in FIG. 2) made of carbon or the like are provided on both edge portions of the ITO film 15 formed on the glass substrate 12 in a vertical (Y) direction.

An analog switch section 20 applies predetermined voltages to the electrodes 15a, 15b, 16a and 16b under control of the microcomputer 3 in order to detect the X and Y coordinates. The electrode 15a is connected to a fixed contact a of a switch 23 in the analog switch section 20 and a fixed contact b and a movable contact of the switch 23 are grounded. The electrode 15b is connected to a movable contact of a switch 25 in the analog switch section 20, and a fixed contact a thereof is connected to a movable contact of a switch 22.

The electrode 16a is coupled with a fixed contact b of a switch 24 in the analog switch section 20 and a fixed contact a and a movable contact of the switch 24 are grounded. The electrode 16b is connected to movable contacts of switches 21 and 26 in the analog switch section 20. A fixed contact a of the switch 26 is electrically floated and a fixed contact b thereof is connected through a resistor 27 having a relatively high resistance to a power supply terminal receiving the DC voltage Vs. The resistance value between the electrodes 16a and 16b for the ITO film 16 and the resistance value between the electrodes 15a and 15b for the ITO film 15 are respectively few hundreds ohms, but the resistance value of the resistor 27 is, for example, 47K ohms.

A fixed contact b of the switch 21 and a fixed contact a of the switch 22 are connected to a power terminal receiving the DC voltage Vs. A signal from a fixed terminal a of the switch 21 or a fixed terminal b of the switch 22 is an output signal of the analog switch section 20 that is applied through a lowpass filter (LPF) 28 to an A/D converter 29. The digitized signal by the A/D converter 29 is applied to the microcomputer 3. The lowpass filter 28 eliminates a noise produced by a back light (fluorescent light) for the LCD panel 9.

The switches 21 through 24 of the analog switch section 20 are controlled by a selection signal SELA from the microcomputer 3 wherein the fixed contacts a are selected when the selection signal SELA is a high level "H" and the fixed contacts b are selected when the selection signal SELA is a low level "L". The switches 25 and 26 of the analog switch section 20 are controlled by a selection signal SELB from the microcomputer 3 wherein the fixed contacts a are selected when the selection signal SELB is the high level "H" and the fixed contacts b are selected when the selection signal SELB is the low level "L".

The condition of the analog switch selection 20 is changed to one of three modes, namely, an X coordinate sampling mode, a Y coordinate sampling mode and a pen-on/off judgment mode, under control of the selection signals SELA and SELB from the microcomputer 3.

Figure 4:
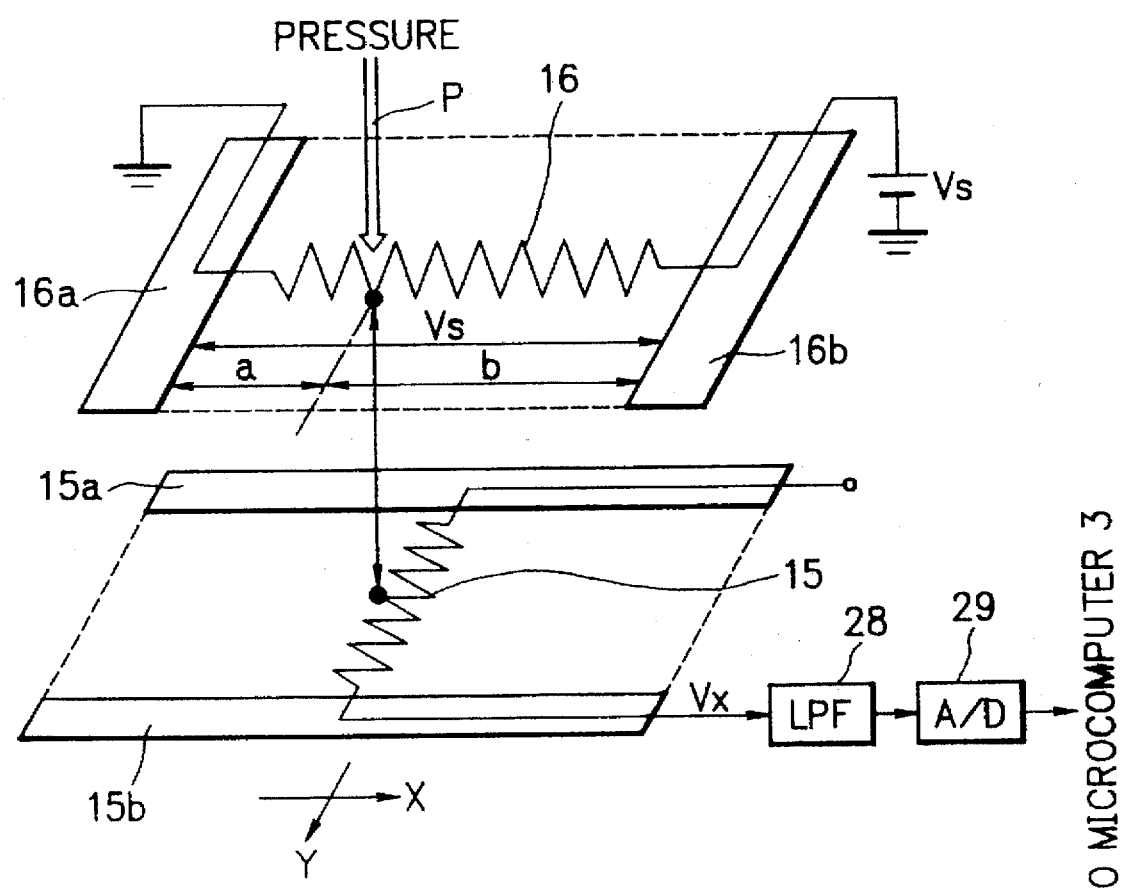
FIG. 4 shows an X-coordinate sampling mode of the touch panel.

The X coordinate sampling mode will be discussed first. In this mode, the selection signal SELA is the low level "L" and the selection signal SELB is the high level "H" so that the switches 21–24 select the fixed contacts b and the switches 25 and 26 select the fixed contacts a. Thus, according to this mode the electrode 16a is grounded the electrode 16 receives the DC voltage Vs and the voltage Vx obtained from the electrode 15b is applied to the microcomputer 3 via the lowpass filter 28 and the A/D converter 29 as shown in FIG. 4 (the ITO films 15 and 16 are represented by resistors equivalently).

In this instance, if the position pressed by a pen 30 shown by an arrow P is a position where the ITO film 16 is internally divided in a ratio a:b in the X direction, the voltage Vx derived from the electrode 15b is Vs×a/(a+b). This voltage Vx is the X coordinate value (X address data) of the pressed position and is applied to the microcomputer 3.

Figure 5:
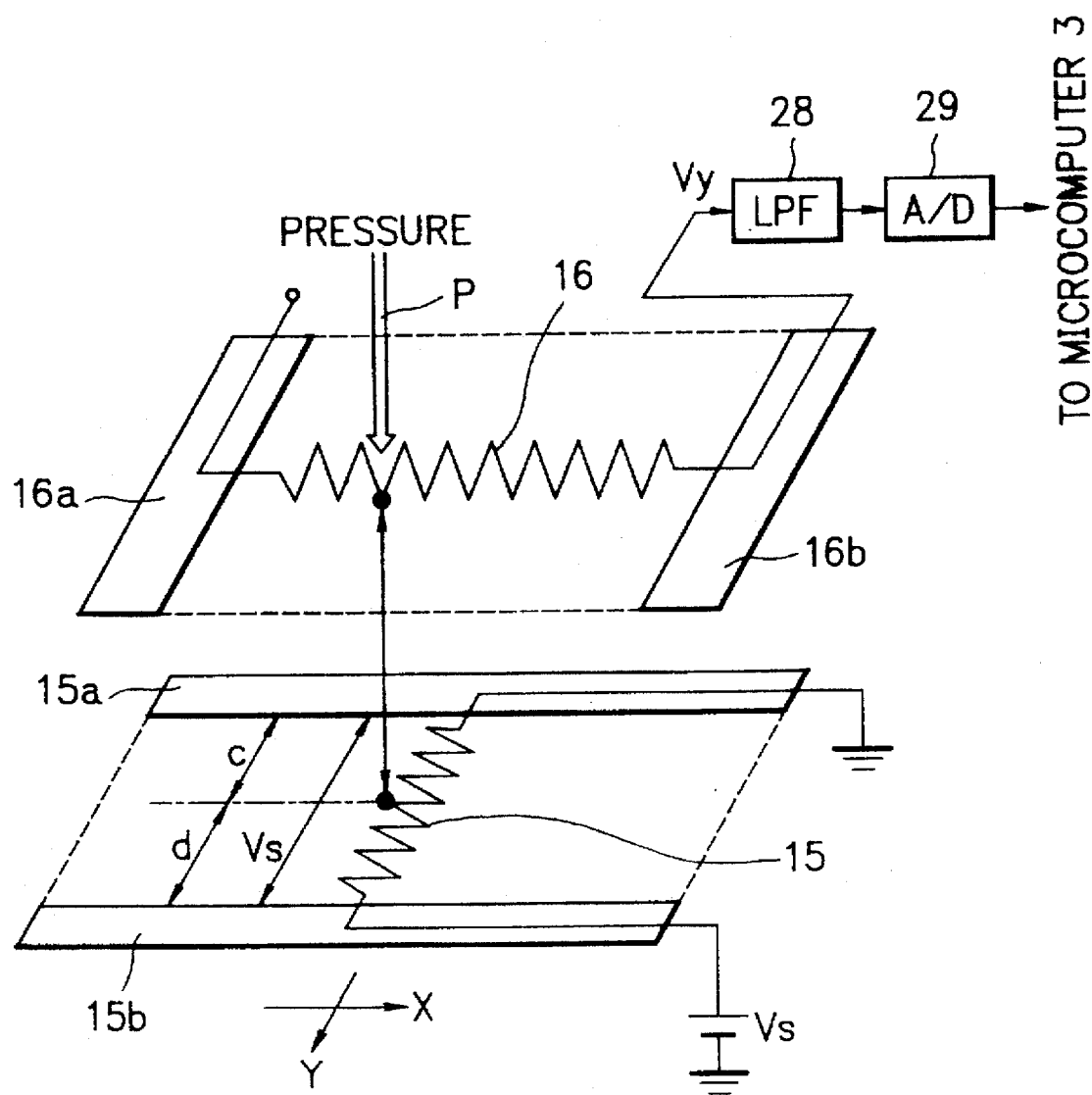
FIG. 5 shows a Y-coordinate sampling mode of the touch panel.

The Y coordinate sampling mode will be explained hereinafter. In this mode, both the selection signals SELA and SELB are the high level "H" and the switches 21–26 select the fixed contacts a. Thus, this mode cause the electrode 15a to be grounded, the electrode 15b to receive the DC voltage Vs and a voltage Vy derived at the electrode 16b to be applied to the microcomputer 3 via the lowpass filter 28 and the A/D converter 29 as shown in FIG. 5 (ITO films 15 and 16 are represented as resistors equivalently).

When the position pressed by the pen 30 shown as the arrow P is a position where the ITO film 15 is internally divided in a ratio c:d in the Y direction, the voltage Vy generated at the electrode 16b is Vs×c/(c+d). This voltage Vy is applied as the Y coordinate value (Y address data) to the microcomputer 3.

Figure 6:
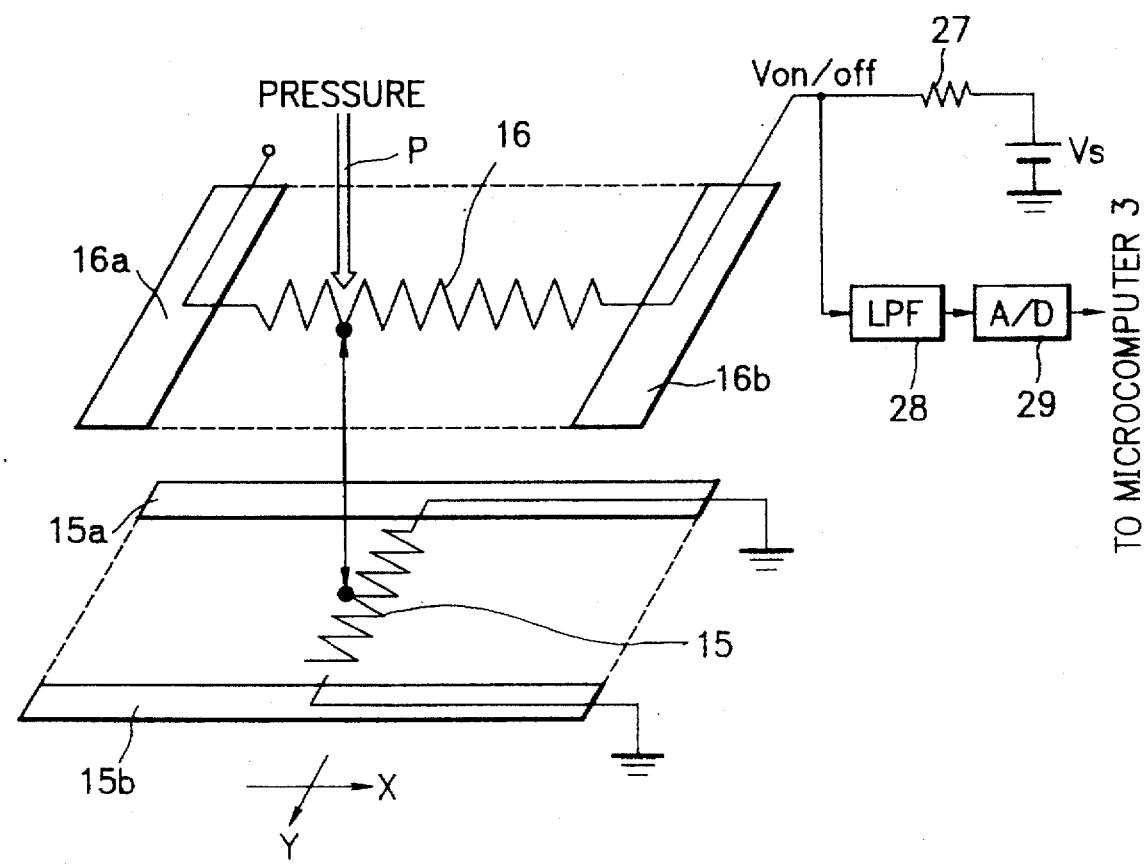
FIG. 6 shows a pen-on/off judgment mode of the touch panel.

The pen-on/off mode will be discussed. In this mode, since the selection signal SELA is the high level "H" and the selection signal SELB is the low level "L", the switches 21–24 select the fixed contacts a and the switches 25 and 26 select the fixed contacts b. Therefore, according to this mode, the electrodes 15a and 15b are grounded, the electrode 16b receives the DC voltage Vs via the resistor 27 and a voltage Von/off derived from the electrode 16b is applied as the pen-on/off judgment data to the microcomputer 3 through the lowpass filter 28 and the A/D converter 29 as shown in FIG. 6 (the ITO films 15 and 16 are represented by resistors equivalently).

In this instance, when the pen 30 is pressed with sufficient pressure as shown by the arrow P, the ITO films 15 and 16 touch to each other. Thus, the voltage Von/off becomes the low level "L" and the microcomputer 3 judges the pen-on condition. On the other hand, when the pressure of the pen 30 is not sufficient, the ITO films 15 and 16 do not touch each other. The voltage Von/off becomes the high level "H" and the microcomputer 3 judges the pen-off condition.

Figure 7:
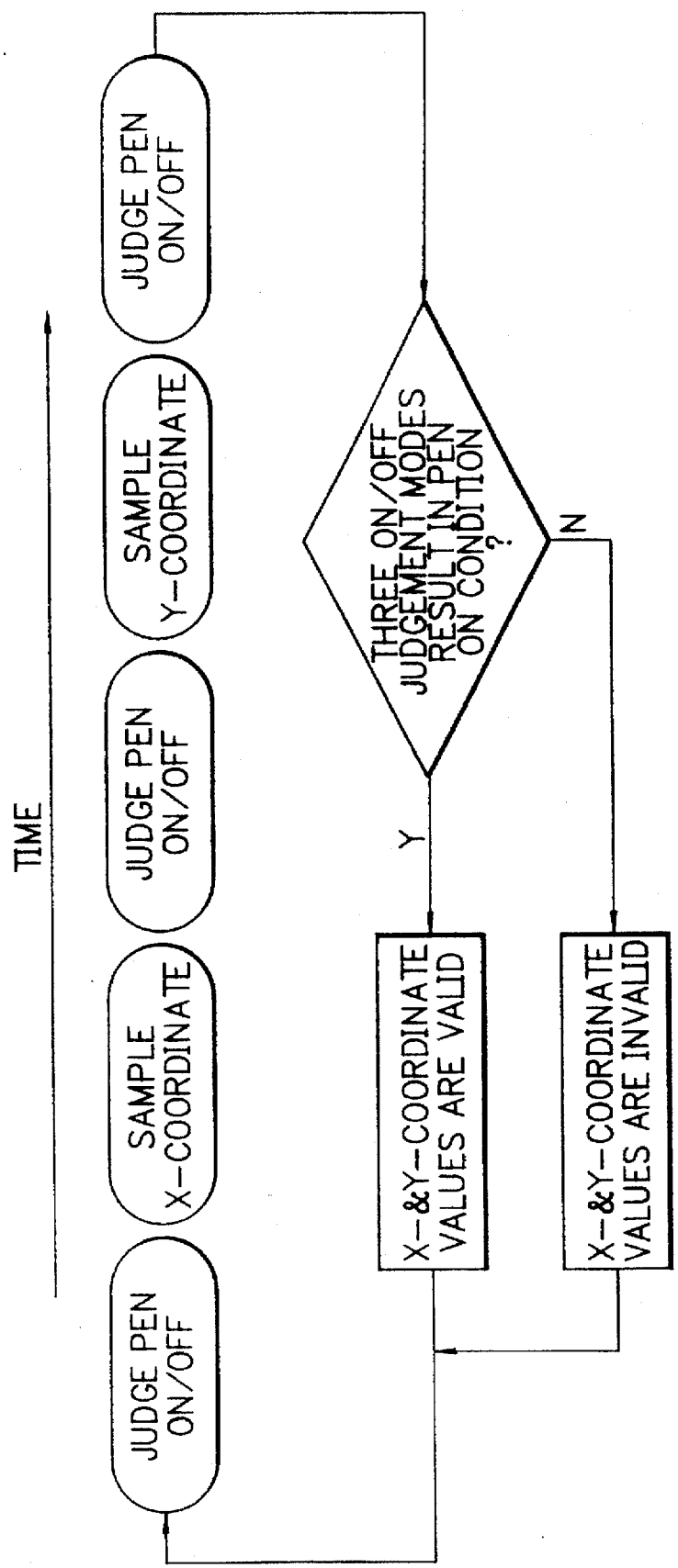
FIG. 7 illustrates a coordinate detection operation.

As shown in FIG. 7, the microcomputer 3 selects alternately the X coordinate sampling mode and the Y coordinate sampling mode and selects the pen-on/off judgment mode before and after each the sampling mode. In a case of setting the pen input mode, only when the pen-on condition is detected in all three pen-on/off judgment modes positioned before and after each sampling modes are the X coordinate value and the Y coordinate value derived at each the sampling mode are judged to be valid. Thus, this process prevents the X and Y coordinate error values based on insufficient pressure of the pen 3 from being detected.

Refer to FIG. 1 again, the dot data of one screen can be written in a static RAM (SRAM) 31. A RAM controller 10 controls write and read operation of dot data to and from the SRAM 31 under control of the microcomputer 3. The RAM controller 10 receives the master clock CLK, the horizontal synchronous signal HD and the vertical synchronous signal VD from the camera section 1. The master clock CLK, the horizontal synchronous signal HD and the vertical synchronous signal VD are applied to the other blocks (not shown) if necessary.

A series circuit of a resistor 32 and the connection switch 33 is inserted between the power supply terminal and ground and a voltage Vm at a common junction of the resistor 32 and the switch 33 is applied as mode setting data to the microcomputer 3. In this case, if the switch is the off condition, the voltage Vm is the high level "H" that represents the pen input mode. If the switch 33 is the on condition, the voltage Vm is the low level "L" that represents the key operation mode.

A series circuit of a resistor 34 and a connection switch 35 is connected between the power supply terminal and ground and a voltage Vc at a common junction of the resistor 34 and the switch 35 is applied as clear data to the microcomputer 3. In this instance, if the switch 35 is turned on, the voltage Vc is the low level "L". Then, in the pen input mode, the RAM controller 10 clears the dot data in the SRAM 31 under control of the microcomputer 3.

In a case that the switch 33 is turned off to set the pen input mode, the address data (x,y) for the SRAM 31 is produced and adjusted such that the X coordinate value Vx and the Y coordinate value Vy applied to the microcomputer 3 by the A/D converter 29 match the picture angle of the LCD panel 9 and a dot appears at a position where the pen 30 is pressed. Then, the microcomputer 3 applies the address data (x,y) to the RAM controller 10 and the dot data is written in the corresponding address location of the SRAM 31.

When the switch 33 is turned on to select the key operation mode, the dot data is written in the SRAM 31 in accordance with the address data (x,y) that corresponds to the operation key display stored in a key display table (not shown) in the microcomputer 3. In this case, since the LCD panel displays only the operation key necessary for changing from the current condition to the next condition, the number of the displayed operation keys can be reduced and the user operability can be improved.

When the pen input mode is set, the RAM controller 10 reads the dot data from the SRAM 31 in synchronism with the pick-up video signal SVi and applies it to the microcomputer 3 under control of the microcomputer 31. The RAM controller 10 controls the selection of the switch 7 under control of the microcomputer 3. Since the switch 7 selects the fixed contact a in response to the dot data, for example, the white level signal Swh corresponding to the dot data is superimposed on the pick-up video signal SVi in order to generate the display video signal SVd. Therefore, the LCD panel 9 displays the superimposed result where the image, such as characters and graphics, produced by the press operation of the pen 30 to the touch panel 11 is superimposed on, for example, the pick-up video signal SVi.

In a case that the pen input mode is set, the RAM controller 10 controls the selection of the switch 6 under control of the microcomputer 3. The switch 6 selects the fixed contact b in response to the dot data, so that the white level signal Swh corresponding to the dot data is superimposed on the pick-up video signal SVi in order to produce the recording video signal SVr. Thus, the deck section 2 can record the recording video signal SVr that is generated by superimposing the white signal Swh corresponding to the image, such as the characters and graphics, on the pick-up video signal SVi.

When the key operation mode is set, the RAM controller 10 reads the dot data from the SRAM 31 in synchronism with the pick-up video signal SVi and applies it to the microcomputer 3 under control of the microcomputer 3. The RAM controller 10 controls the selection of the switch 7 under control of the microcomputer 3. Since the switch 7 selects the contact a in response to the dot data, the white level signal Swh corresponding to the dot data is superimposed on, for example, the pick-up video signal SVi in order to generate the display video signal SVd. Therefore, the LCD panel 9 displays the superimposed result where the image of the operation key is superimposed on, for example, the picture video signal SVi.

In this condition, when the user presses a position of the touch panel 1 corresponding to the operation key displayed on the LCD panel 9, the microcomputer 3 recognizes the pressed operation key in accordance with the X coordinate value and the Y coordinate value applied from the A/D converter 29. The microcomputer 3 applies the mode signal corresponding to the operation key to the mode microcomputer 4, and the mode microcomputer 4 controls the operation of the deck section 2 by means of the mechanical control microcomputer 40 or controls the selection of the switch 5. If the key operation mode is set, the switch 6 remains connected to contact a and the deck section 2 receives the pick-up video signal SVi as the recording video signal Svr.

Figure 8:
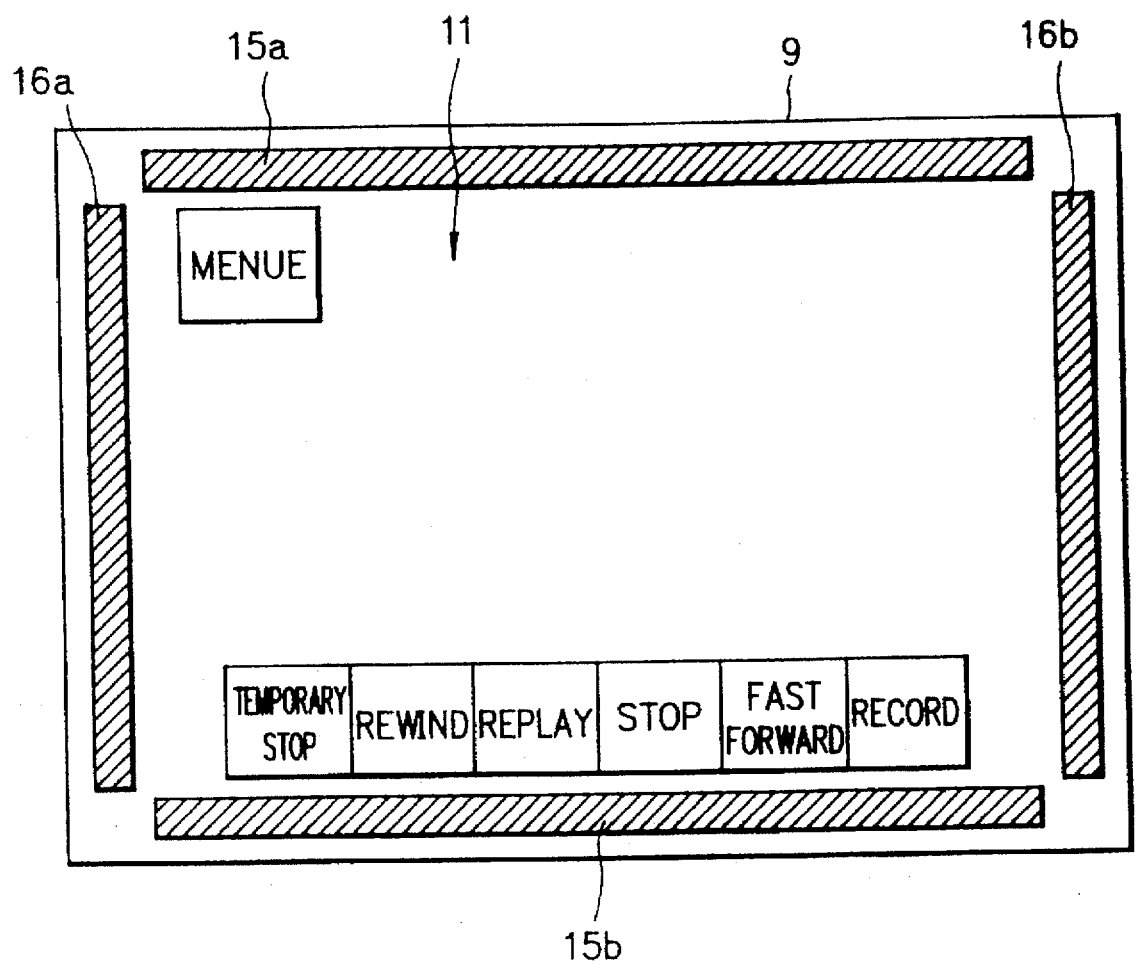
FIG. 8 shows an example of a display in a key operation mode.
Figure 9A:
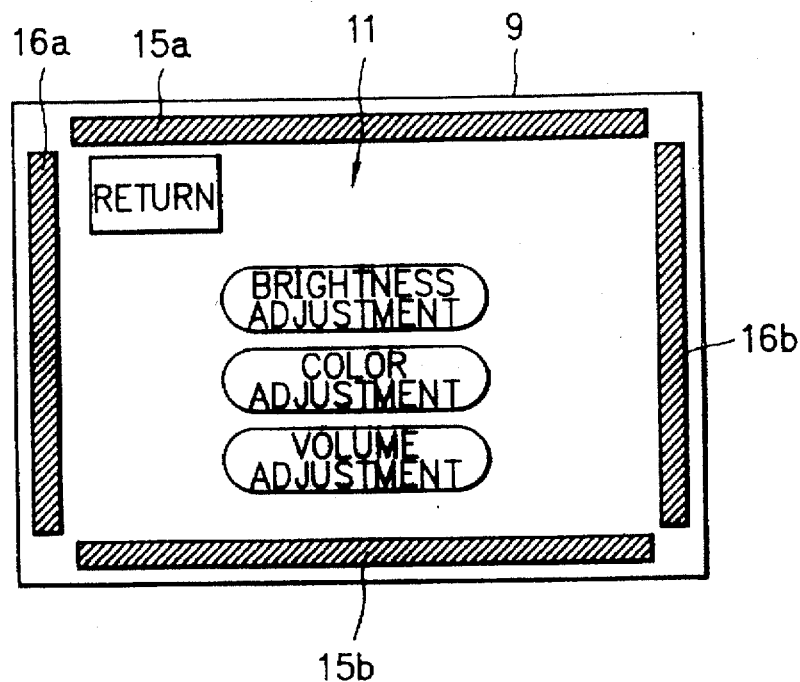
FIG. 9 shows an example of a hierarchy display

FIG. 8 shows a display example on the LCD panel 9 in the key operation mode. When pressing an area of the touch panel 11 corresponding the displayed operation key, the operation corresponding to the pressed operation key would be performed. If the display area of the menu key portion is pressed, the LCD panel 9 displays operation keys as shown in FIG. 9A in order to select additional functions, such as a brightness adjustment, a color adjustment or a volume adjustment (audio system is not shown).

Figure 9B:
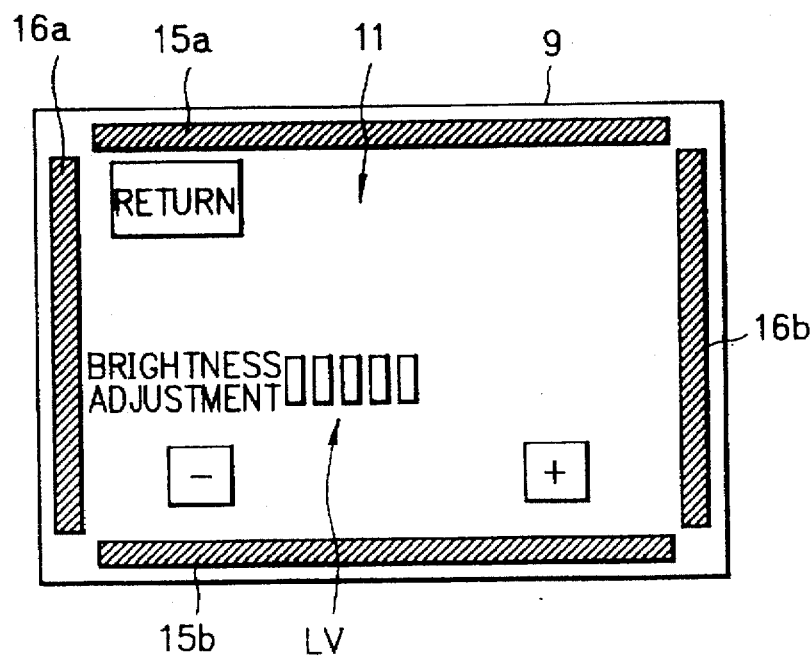

FIG. 9B shows a display example when the display area of the brightness adjustment key is pressed. The display includes operation keys (plus key and minus key) for adjusting the brightness and the adjustment level LV. If the return key is pressed in the screen of FIGS. 9A and 9B, the previous screen can be recalled.

Figure 10:
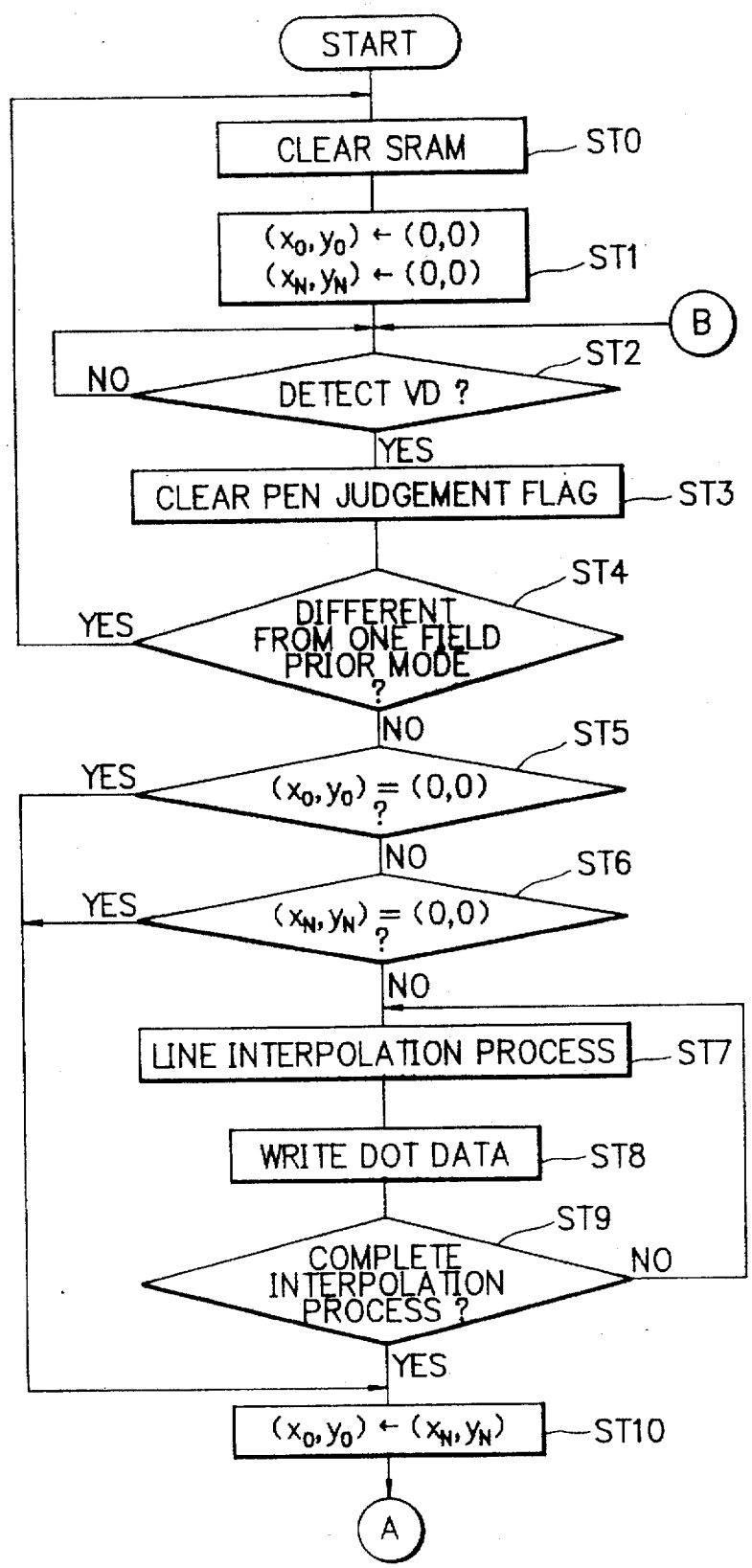
FIG. 10 is one half of a flow chart for explaining a microprocessor process.
Figure 11:
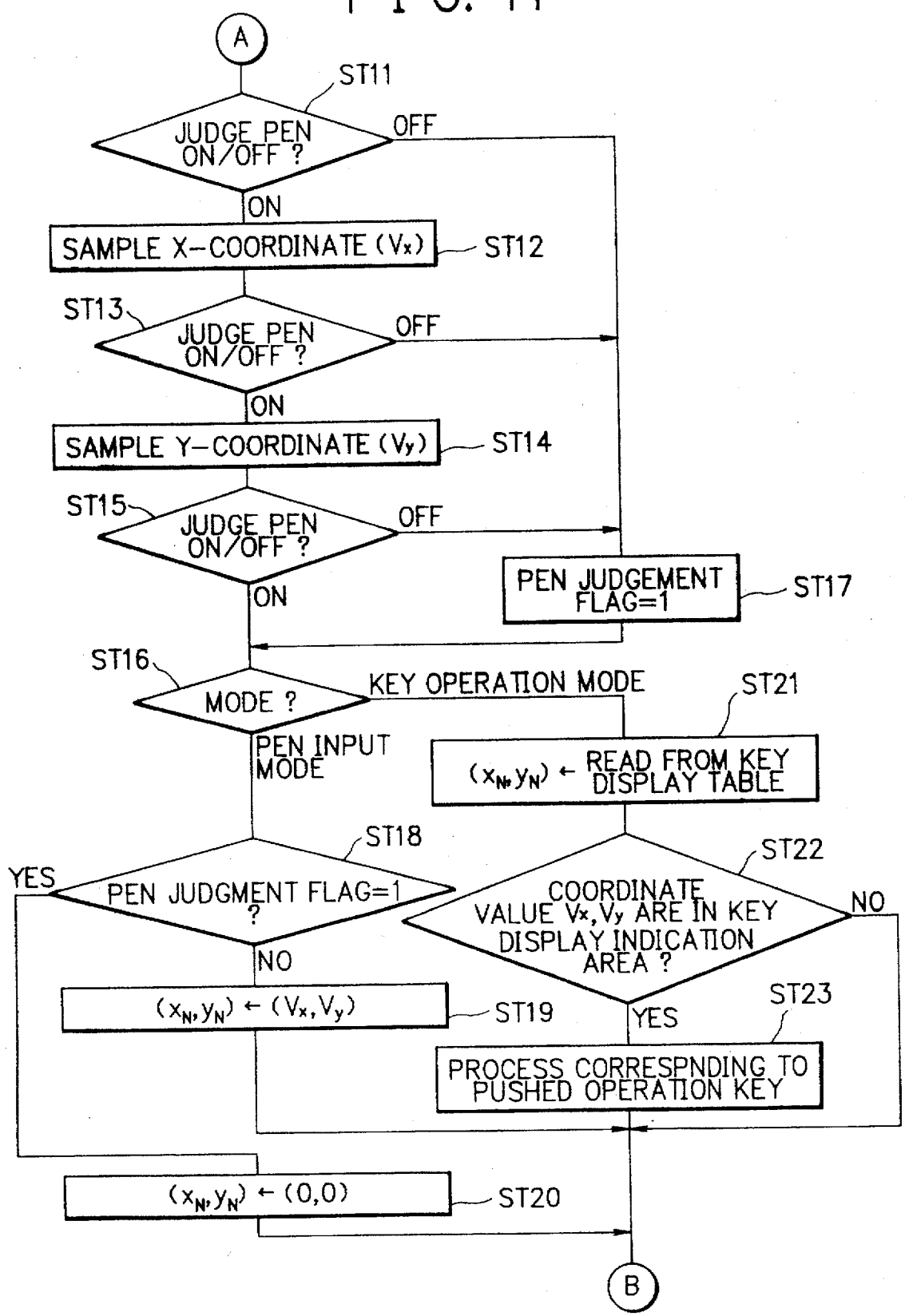
FIG. 11 is the other one half of the flow chart for explaining the microprocessor process.

The following description relates to a process of writing the dot data in the SRAM 31 by the microcomputer 3 and other processes by reference to FIGS. 10 and 11.

In a step ST0, the SRAM 31 is cleared. The step ST1 changes the one field prior address data (x0,y0) to (0,0) and changes the current address data (xN, yN) to (0,0). The step ST2 judges whether the vertical synchronous signal VD is detected or not. If the vertical synchronous signal VD is detected, the process advances to a step ST3 where a pen judgment flag is cleared.

The next step ST4 determines whether the setting condition of the pen input mode or the key operation mode is different from the condition of one field prior mode (i.e., the mode prior by one field with respect to the current mode). If the current mode is different from the one field prior mode, the process returns to the step ST0. If the current mode is the same as the one field prior mode, the process advances to a step ST5. The step ST5 determines whether the one field prior address data (x0,y0) is (0,0) or not. If (x0,y0) is not (0,0) in the step ST5, the process goes to the step ST6 where the current address data (xN,yN) is judged to be (0,0) or not.

If (xN, yN) is not (0,0) in the step ST6, a step ST7 executes a linear interpolation.

Since the X coordinate and the Y coordinate are sampled one time every field, there is a possibility that dots are not connected since the touch panel 11 is scanned intermittently.

Therefore a line between (x0,y0) and (xN,yN) is process by the linear interpolation. In a step ST8, the dots are written in the SRAM 31 at the address data (x0,y0) and the address data produced by the liner interpolation.

A step ST9 determines whether the interpolation process is completed or not. If the interpolation process is completed, a step 10 replaces (x0,y0) with (xN, yN) such that the one field prior address data (x0,y0) is succeeded by the current field address data (xN,yN). If (x0,y0)=(0,0) in the step ST5 and (xN,yN)=(0,0) in the step ST6, the next step is the step ST10.

A step ST11 judges whether the result of the pen-on/off judgment mode is the pen-on condition or the pen-off condition. If the pen-on condition is judged in the step ST11, a step ST12 obtains the X coordinate value Vx for the X coordinate sampling mode (refer to FIG. 4).

A step ST13 determines whether the pen-on/off judgment mode is in the pen-on condition or the pen-off condition. If the step ST13 is in the pen-on condition, a step ST14 obtains the Y coordinate value Vy for the Y coordinate sampling mode (refer to FIG. 5). A step ST15 determines whether the pen-on/off judgment mode is in the pen-on condition or the pen-off condition.

If the step ST15 is in the pen-on condition, the process advances to a step ST16. If the pen-off condition is determined in the steps ST11, ST13 or ST15, a step ST17 sets a pen judgment flag=1 and advances to the step ST16. In the step ST16, the set mode is determined to be the pen input mode or the key operation mode. If the pen input mode is set, a step ST18 determines whether the pen judgment flag=1 or not.

If the pen judgment flag is not 1 in the step ST18, the coordinate values Vx and Vy are valid. These coordinate values Vx and Vy are processed and adjusted such that they match the image angle on the LCD panel 9 and a dot appears at the position where the pen 30 is pressed in order to generate the current field address data (xN, yN) for the SRAM 31. Then, the process returns the step ST2. If the pen judgment flag=1 in the step ST18, the coordinate values Vx and Vy are invalid. A step ST20 sets (xN, yN)=( 0,0 ) and returns the step ST2.

If the step ST16 detects the key operation mode, the address data is read from the key display table in the microcomputer 3 for displaying the operation key and is substituted for (xN,yN) in a step ST21. A step ST22 judges whether the coordinate values Vx and Vy are in the key display indication area or not. If so, a step ST23 executes a process corresponding to the pressed operation key, e.g., the mode signal is applied to the mode microcomputer 4. Then, the process returns the step ST2. If the coordinate values Vx and Vy are not in the key display indication area in the step ST22, no process is done. Then, the process returns the step ST2.

In the above discussed embodiment, it is easy to produce the image data (dot data) of the characters, graphics and the like for forming, for example, the title image by pressing the touch panel 17 in the pen input mode. Since the white level signal Swh corresponding to the dot data can be superimposed on, for example, the pick-up video signal SVi in order to generate the display video signal SVd, the image data can be formed while confirming the image to be formed by using the screen of the LCD panel 9. Since the white level signal Swh corresponding to the dot data can be superimposed on the pick-up video signal SVi for generating the recording video signal SVr in the pen input mode, it is easy to record the title image in the deck section 2.

In the key operation mode, the white level signal Swh corresponding to the dot data of the key operation screen can be superimposed on the pick-up video signal SVi or the replayed video signal Svp for generating the display video signal SVd. Thus, the operation key can be displayed on the screen of the LCD panel 9. If the user pushes a portion of the touch panel 11 corresponding to the desired operation key, the operation corresponding to the pressed operation key would be executed. Since the user operates only the display screen of the LCD panel 9, the operation can be easily done while monitoring the display screen. The number of operation keys mounted on the video camera panel 1 can be reduced and, the video camera can be designed with a high flexibility. Only the necessary operation key for changing from the current condition to the next condition is displayed on the screen of the LCD panel 9, so that the display on the screen can be simplified and the user operability can be improved.

As described hereinbefore, the operation key is displayed on the LCD panel 9 in the key operation mode. However, the pick-up video signal SVi is applied as the recording video signal SVr to the deck section 2. Thus, the deck section 2 records the video signal on which the operation key screen data is not superimposed.

In the above discussed embodiment, the touch panel 11 is pressed by the pen 30. However, a hand or other means can be used to press the touch panel. If memory means, not discussed the above, is provided for storing the image data (dot data) of the characters, graphics and the like formed in the pen input mode, the image data can be read at any desired time. The embodiment uses the resistance film type touch panel 11, but the kind of the touch panel is not limited to this type and another type, for example, an electrostatic capacitance type, touch panel may be used. In addition, the LCD panel having a function of detecting a pen input coordinate may be used. The display device of the embodiment is the LCD panel 9, but another type display device, such as a CRT can be used.

What is claimed is:

1. A video apparatus, comprising:

a display device;

video signal input means;

position detection means disposed on a display screen of said display device for detecting a pressed position of said display screen;

image data forming means for forming image data;

superimposing means connected to said image data forming means, said display device, said position detecting means, and said video signal input means for superimposing the image data formed by said image data forming means on a video signal from said video signal input means for display on said display device at a position corresponding to the pressed position detected by said position detection means;

operating key generating means connected to said superimposing means for superimposing operation key screen data on the video signal for displaying operation keys on said display device; and operation signal generation means connected to said position detection means for generating an operation signal when the pressed position detected by said position detection means corresponds to the displayed operation keys.

2. A video apparatus as recited in claim 1, further comprising:

a recording means connected to said superimposing means for recording the video signal on which the image data is superimposed by said superimposing means.

3. A video apparatus, comprising:

a display device;

video signal input means;

position detection means disposed on a display screen of said display device for detecting a pressed position on said display screen;

image data forming means;

superimposing means connected to said display device, said image data forming means, and to said video signal input means for superimposing operation key screen data on a video signal for display on said display device and for superimposing the image data formed by said image data forming means on the video signal for display on said display device at a position corresponding to the pressed position detected by said position detection means; and operation signal generation means connected to said position detection means for generating an operation signal when the pressed position detected by said position detection means corresponds to an operation key displayed on the display device.

4. A video apparatus as recited in claim 3, wherein only the operation key needed to perform a next operation is displayed in accordance with said operation key screen data.

5. A video apparatus as recited in claim 4, further comprising:

recording means connected to said video signal input means for receiving a video signal on which the operation key screen data is not superimposed.

6. A video signal recording apparatus comprising:

a display device;

video signal input means;

position detection means disposed on a display screen of said display device for detecting a pressed position of said display screen;

image data forming means for forming image data;

superimposing means connected to said image data forming means, said position detection means, and said video signal input means for superimposing the image data formed by said image data forming means on a video signal from said video signal input means to be applied to said display device at a position corresponding to the pressed position detected by said position detection means;

recording means connected to said superimposing means for recording the video signal on which the image data is superimposed by said superimposing means;

operating key generating means connected to said superimposing means for superimposing operation key screen data on the video signal for displaying operation keys on said display deice; and operation signal generation means connected to said position detection means for generating an operation signal when the pressed position detected by said position detection means corresponds to the displayed operation keys.

7. A video signal recording apparatus as recited in claim 6 wherein only the operation key needed to perform a next operation is displayed in accordance with said operation key screen data.

8. A video signal recording apparatus as recited in claim 7 further comprising:

a recording means connected to said video signal input means for receiving a video signal on which the operation key screen data is not superimposed.

9. A video signal recording apparatus comprising:

a camera;

a display device;

position detection means disposed on a display screen of said display device for detecting a pressed position of said display screen.

image data forming means for forming image data;

superimposing means connected to said image data forming means, said camera, said position detection means, and said display device for superimposing the image data formed by said image data forming means on a video signal from said camera for display on said display device at a position corresponding to the pressed position detected by said position detection means, recording means connected to said superimposing means for recording the video signal on which the image data is superimposed by said superimposing means;

operating key generating means connected to said superimposing means for superimposing operation key screen data on the video signal for displaying operation keys on said display device; and operation signal generation means connected to said position detection means for generating an operation signal when the pressed position detected by said position detection means corresponds to the display operation keys.

10. A video signal recording apparatus as recited in claim 9 wherein only the operation key needed to perform a next operation is displayed in accordance with said operation key screen data.

* * * * *

UNITED STATES PATENT AND TRADEMARK OFFICE
CERTIFICATE OF CORRECTION

PATENT NO. : 5,671,014
DATED : Sept. 23, 1997
INVENTOR(S) : Masanobu Ito, et al

It is certified that error appears in the above-identified patent and that said Letters Patent is hereby corrected as shown below:

On title page, item [56]

Page, under <u>OTHER PUBLICATIONS,</u>
line 3, change "GB2 096 967" to --GB 2 096 867--
Col.1, line 60, delete "a configuration of"
Col.2, line 6, after "display" insert --;--
Col.3, line 58, after "mode" insert --,--
      same line, after "grounded" insert --,--
Col.4, line 17, change "Vyis" to --Vy is--
      line 42, delete "the"
      line 47, delete "are"
      line 49, change "insurricient" to --insufficient--
      line 52, change "operation" to --operations--
Col.5, line 33, change "31" to --3--
Col.7, line 46, change "17" to --11--
Col.8, line 1, delete "panel"
      line 20, change "the" to --a--

<u>In the claims</u>:

Col.10, line 18, after "screen" insert --;--
      line 27, change "." to --;--

Signed and Sealed this

Eighth Day of September, 1998

Attest:

BRUCE LEHMAN

Attesting Officer      Commissioner of Patents and Trademarks